(12) United States Patent
Ramanathan et al.

(10) Patent No.: US 8,135,124 B2
(45) Date of Patent: Mar. 13, 2012

(54) COMMUNICATING INFORMATION PERTAINING TO CANCELLING OF FORKED CALL REQUESTS

(75) Inventors: Rajesh Ramanathan, Redmond, WA (US); Pradipta Kumar Basu, Redmond, WA (US); Paul Tidwell, Sammamish, WA (US); Srivatsa Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 12/053,100

(22) Filed: Mar. 21, 2008

(65) Prior Publication Data
US 2009/0238358 A1 Sep. 24, 2009

(51) Int. Cl.
H04M 3/42 (2006.01)
(52) U.S. Cl. ......... 379/211.04; 379/211.01; 379/211.02; 379/211.03; 379/212.01; 379/221.01
(58) Field of Classification Search ............. 379/211.04, 379/211.02, 251, 88.16, 373.01
See application file for complete search history.

(56) References Cited

U.S. PATENT DOCUMENTS

| | | | |
|---|---|---|---|
| 7,002,912 B2 | 2/2006 | Wengrovitz | 370/230 |
| 7,257,201 B2 | 8/2007 | Singh et al. | 379/88.13 |
| 2003/0095569 A1 | 5/2003 | Wengrovitz et al. | 370/467 |
| 2003/0215078 A1* | 11/2003 | Brahm et al. | 379/211.02 |
| 2005/0074031 A1 | 4/2005 | Sunstrum | 370/493 |
| 2006/0270362 A1 | 11/2006 | Emrich et al. | 455/90.2 |
| 2007/0127685 A1* | 6/2007 | Bae et al. | 379/251 |
| 2007/0154004 A1* | 7/2007 | Daigle | 379/211.04 |
| 2007/0206580 A1 | 9/2007 | Silver et al. | 370/356 |
| 2008/0002820 A1* | 1/2008 | Shtiegman et al. | 379/211.02 |
| 2008/0192904 A1* | 8/2008 | Vagelos | 379/88.16 |
| 2009/0097631 A1* | 4/2009 | Gisby et al. | 379/211.02 |
| 2010/0074247 A1* | 3/2010 | Clark et al. | 370/352 |

FOREIGN PATENT DOCUMENTS

CN EP1798947 A1 8/2001

OTHER PUBLICATIONS

Rosenberg at al, RFC 3261—SIP, Jun. 2002, Network Working Group.*
SIP-Specific Event Notification http://www.softarmor.com/wgdb/docs/draft-ietf-sip-events-02.pdf, Feb. 2002.
The Session Initiation Protocol: Providing Advanced Telephony Services Across the Internet http://64.233.179.104/scholar?num=100&hl=en&lr=&q=cache:TyiS_WwVXXsJ:www.cs.columbia.edu/~hgs/papers/Schu99_Session.ps+, 2008.
CINEMA: Columbia InterNet Extensible Multimedia Architecture http://www1.cs.columbia.edu/~library/TR-repository/reports/reports-2002/cucs-011-02.pdf, 2008.
Enterprise Voice http://technet.microsoft.com/en-us/library/bb663697.aspx, 2007.
Serial Forking and 605 Draft-Rajesh-Sipping-605-01.txt http://www.tech-invite.com/SIPWGs/02-WG-SIPPING/PDF/draft-rajesh-sipping-605-01.pdf.

* cited by examiner

Primary Examiner — Joseph J Nguyen
(74) Attorney, Agent, or Firm — Merchant & Gould (57) ABSTRACT

Multiple instances of an incoming call in a unified communication system capable of communicating through multiple networks are provided to devices and/or applications associated with the called party. Upon acceptance or a global rejection of the incoming call through one of the end devices/applications, the remainder are provided a cancellation notice for the forked call request that includes information associated with which end device took the action, what type of action was taken, whether the action was based on automatic policy implementation.

13 Claims, 8 Drawing Sheets

COMMUNICATING INFORMATION PERTAINING TO CANCELLING OF FORKED CALL REQUESTS

BACKGROUND

As an alternative to Public Switched Telephone Network (PSTN) systems, cellular phone networks have proliferated over the last decade where users with cellular phones have access to one or more networks at almost any location. Also a recent development is the wide spread use of Voice over IP (VoIP) telephony, which uses internet protocol over wired and wireless networks. With the availability of such diverse types of communication networks and devices capable of taking advantage of various features of these networks, a new technology is bringing different communication networks together providing until now unavailable functionality such as combining various modes of communication (e.g. instant messaging, voice calls, video communications, etc.). This technology is referred to as unified communications (UC). A network of servers manages end devices capable of handling a wide range of functionality and communication while facilitating communications between the more modern unified communication network devices and other networks (e.g. PSTN, cellular, etc.).

In addition to accommodating various modes of communication, modern real time communication systems such as UC systems can facilitate presence and routing capabilities, which basically enable a user to place and receive calls (in any communication form) through a number of end devices regardless of physical location. For example, a user may define a destination number (identifier), where he/she can be reached at different times or depending on the context of the call, and the system is capable of routing the call based on the user provided rules.

When a call is made ringing multiple user end devices or applications (i.e. forking) and one of the endpoints answer, the ringing is stopped at all other stations. This is an example of a situation where a request is forked, then answered in a station, which results in a cancellation of the forked requests at all other stations. Another example of request cancellation is when one of the endpoints declines the request globally resulting in all the other forked requests getting cancelled. In conventional systems, the endpoints where the call request is cancelled may not know why the cancellation occurred.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to conveying additional information associated with cancelled call requests to endpoints not receiving the call such as an action which was performed by another endpoint and identity of the user at that endpoint, and the like. Endpoints may perform specific actions based on the received information such as displaying why the forked call request is cancelled at a particular endpoint.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, forked call requests to multiple end devices may be cancelled upon acceptance or global rejection by one of the devices while the remaining devices are notified as to why the cancellation occurred. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

While the term "call" is mainly used in examples throughout this document as referring to voice communications, it is not so limited. "Call" may also be used in reference to video communications, conference communications, instant messaging, and other forms of communication discussed herein in conjunction with estimating endpoint performance. The term "endpoint" is a general term referring to each end device as well as any server that is directly involved with communications within a unified communication network.

Figure 1:
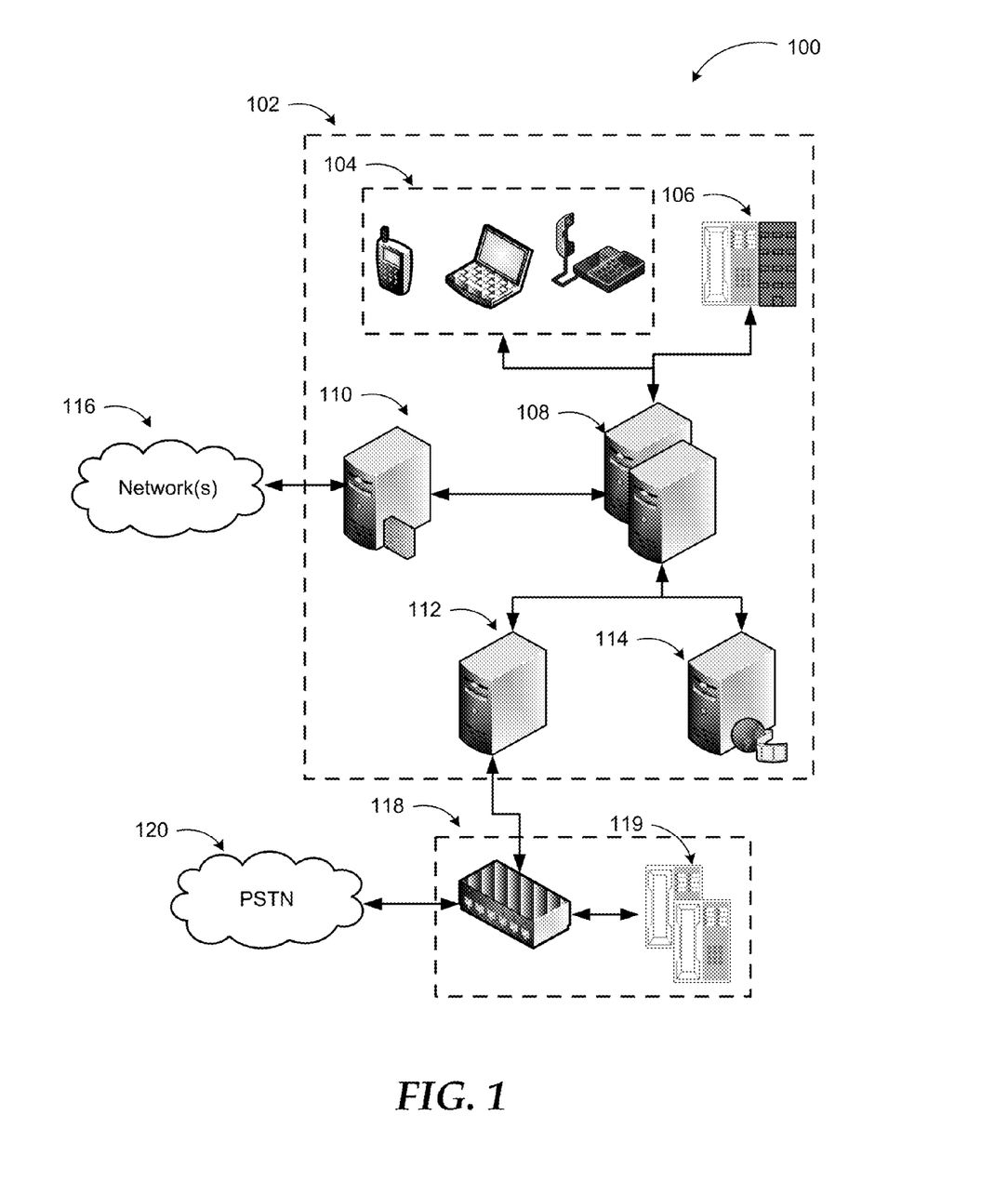
FIG. 1 is a diagram illustrating an example integrated telephony system architecture, where a call may be delivered to multiple end devices simultaneously.

Referring to FIG. 1, diagram 100 of an example integrated telephony system architecture, where a call may be delivered to multiple end devices simultaneously, is illustrated. Cross ringing systems are those where a single call is sent to two or more different systems either parallel or serially such that the user is able to take advantage of distinct abilities of the systems to answer the call. For example, a VoIP system may provide a number of capabilities not available in a PSTN or cellular phone system. In a unified communication system such as system 102, client devices/applications allow access to multiple systems and are able to allow the user to receive the call through the most appropriate one.

In FIG. 1, end devices 104 and 106 are client devices of the UC system 102, which may execute communication applications such a voice communication, video communication, and the like. In addition to their advanced functionality, the end devices may also facilitate traditional phone calls through an external connection such as through PBX 118 and Public Switched Telephone Network (PSTN) 120. End devices may include any type of smart phone, cellular phone, computer application, and advanced phone devices with additional functionality (e.g. phone 106).

UC server 108 provides registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC server 108 is configured to provide access to these additional communication modes (e.g. instant messaging, video communication, etc.) through access server 110. Access server 110 resides in a perimeter network and enables connectivity through network 116 with other users in one of the additional communication modes.

Audio/Video (A/V) conferencing server 114 provides audio and/or video conferencing capabilities by facilitating those over an internal or external network. Mediation server 112 mediates signaling and media to and from the PBX 118. Mediation server 112 may also act as a Session Initiation Protocol (SIP) user agent (e.g. Business-To-Business User Agent "B2BUA"). PBX 118 includes a PBX controller and associated traditional phone devices. PBX 118 facilitates receipt and origination of calls through PSTN 120, which is typically a combination of networks managed by a number of providers.

In a system according to embodiments, users are enabled to share the same identity in both communication systems. The address for the shared identity is used in inbound and outgoing calls. Therefore, the existence of two telephony systems is transparent for other users who interact with the user of the integrated telephony systems. The shared identity is not necessarily limited to a phone number. The identity may take any form depending on the integrated networks, such as a telephone number, a SIP Uniform Resource Identifier (URI), or any other identifier. Furthermore, the shared identity may be in more than one format. For example, it may include a phone number and a SIP URI (using an alias). The phone number is used throughout this text as example for integrated networks that include a PSTN compatible network, but embodiments are not limited to phone numbers of any particular type of shared identity.

In one example scenario, a user may be part of UC system 102 as well as PBX system 118 being able to receive calls through a variety of end devices. When a call comes in to the user's Direct Inward Dial (DID) number, the call is sent (or forked) to both UC system 102 and the PBX 118. A UC client operating end devices registered to the user receives a VoIP Call from UC server 108. In the same instance, UC server 108 is monitoring the PBX 118 for incoming calls to the PBX phone 119. Thus, the UC client also gets a Remote Call Control (RCC) notification of an incoming call. Effectively, the UC client has "two" rings and the user is able to answer the call through the PBX phone 119 through any of the end devices 104 controlled by the UC client (VoIP call).

Figure 2:
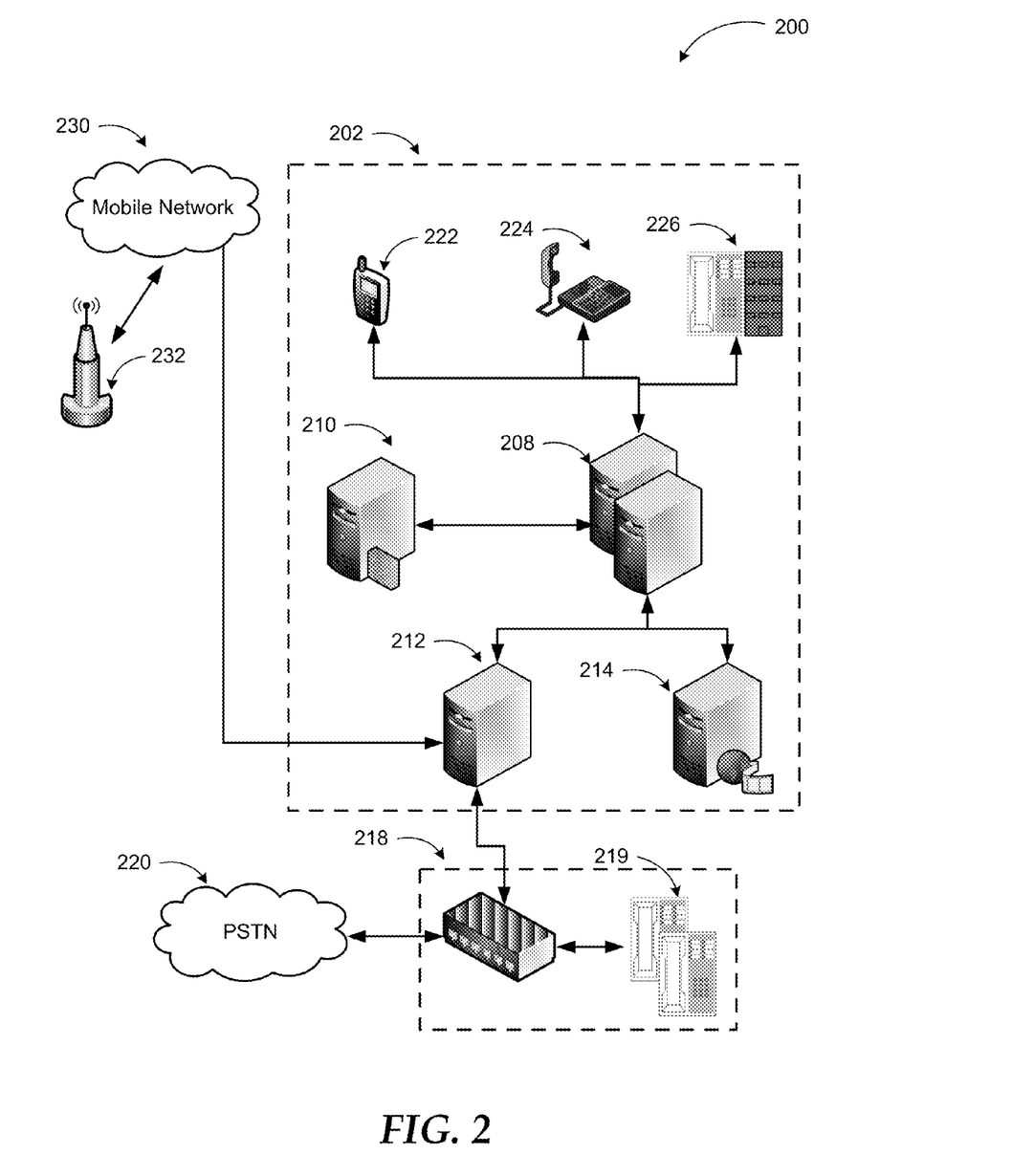
FIG. 2 illustrates another example integrated telephony system, where a call from a mobile network or a Public Switched Telephone Network (PSTN) may be delivered through a unified communication system (e.g. VoIP) path to a subscriber's end device.

FIG. 2 illustrates another example integrated telephony system, where a call from a mobile network or a Public Switched Telephone Network (PSTN) may be delivered through a unified communication system (e.g. VoIP) path to a subscriber's end device. Example integrated system 200 includes UCN 202 facilitating communications for its end devices 222, 224, 226, and any communication applications executed on these devices as described above. Calls may originate within UCN 202, from external mobile network 230, or from PSTN 220. Mobile network 230 may be any wireless communication network such as a cellular network and include other components such as transceiver 232 (e.g. cell tower). PBX system 218 facilitates communications between UCN 202 and PSTN 220.

To illustrate the variety of communication systems that may be integrated employing various embodiments, PBX 218 may adhere to Session Initiation Protocol (SIP). The Session Initiation Protocol (SIP) is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients use Transport Control Protocol ("TCP") or User Datagram Protocol ("UDP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

SIP-enabled telephony networks can also implement many of the more advanced call processing features. SIP is a client/server protocol that enables peer-to-peer connectivity because each side can function as a client and a server at the same time. As such it requires a relatively simple core network with intelligence distributed to the network edge, embedded in endpoints (end devices built in either hardware or software). SIP features are implemented in the communicating endpoints (i.e. at the edge of the network) as opposed to being implemented in the network. While some example systems are described with SIP features, many other VoIP protocols exist and embodiments may be implemented with any of those protocols using the principles described herein.

In the example system 200 of FIG. 2 UCN 202 includes UC end devices 222, 224, and 226 managed by UC server(s) 208. Access server 210, A/V conference server 214, and mediation server 212 are example endpoints (in addition to the end devices) that operate as described above in conjunction with FIG. 1. Optional PBX system 218 includes a PBX controller and PBX end devices (219) that facilitate communications through PSTN 220. UCN 202 may also support UC server(s) that connect to a Time Division Multiplex ("TDM") PBX through mediation server 212. The system(s) may also include a number of gateways (e.g. basic or advanced gateways) for facilitating mediation functionalities. As mentioned above, PBX 218 may also be a SIP PBX in which case the UCN 202 may support SIP and/or RTP based communication.

According to one scenario, a call originating from the mobile network 230 or PSTN 220 may be translated into multiple forked call requests for the called user by the UCN 202. The requests are forwarded to end devices and applications associated with the called user. These may include a desktop phone, a handheld phone, an assistant's phone, and the like. The user may accept the call at one of those devices or reject the call globally meaning he/she does not want the call answered by any of the endpoints associated with the user. Upon receiving the user's response, the UC server(s) 208 may send cancellation notices to the remaining endpoints. In a system according to embodiments, the cancellation notices may be complemented with additional information associated with the cancellation such as which device accepted the call, whether the call was accepted or globally rejected, etc. That way, other end devices and application are enabled to take further actions associated with the call. For example, a recording application may record the time and origin of the call for a report to the user.

While the example systems in FIGS. 1 and 2 have been described with specific components such as mediation server, A/V server, and the like, embodiments are not limited to these components or system configurations and can be implemented with other system configuration employing fewer or additional components. Functionality of the systems enabling cancellation of forked call requests with additional information may also be distributed among the components of the systems differently depending on component capabilities and system configurations.

Figure 3:
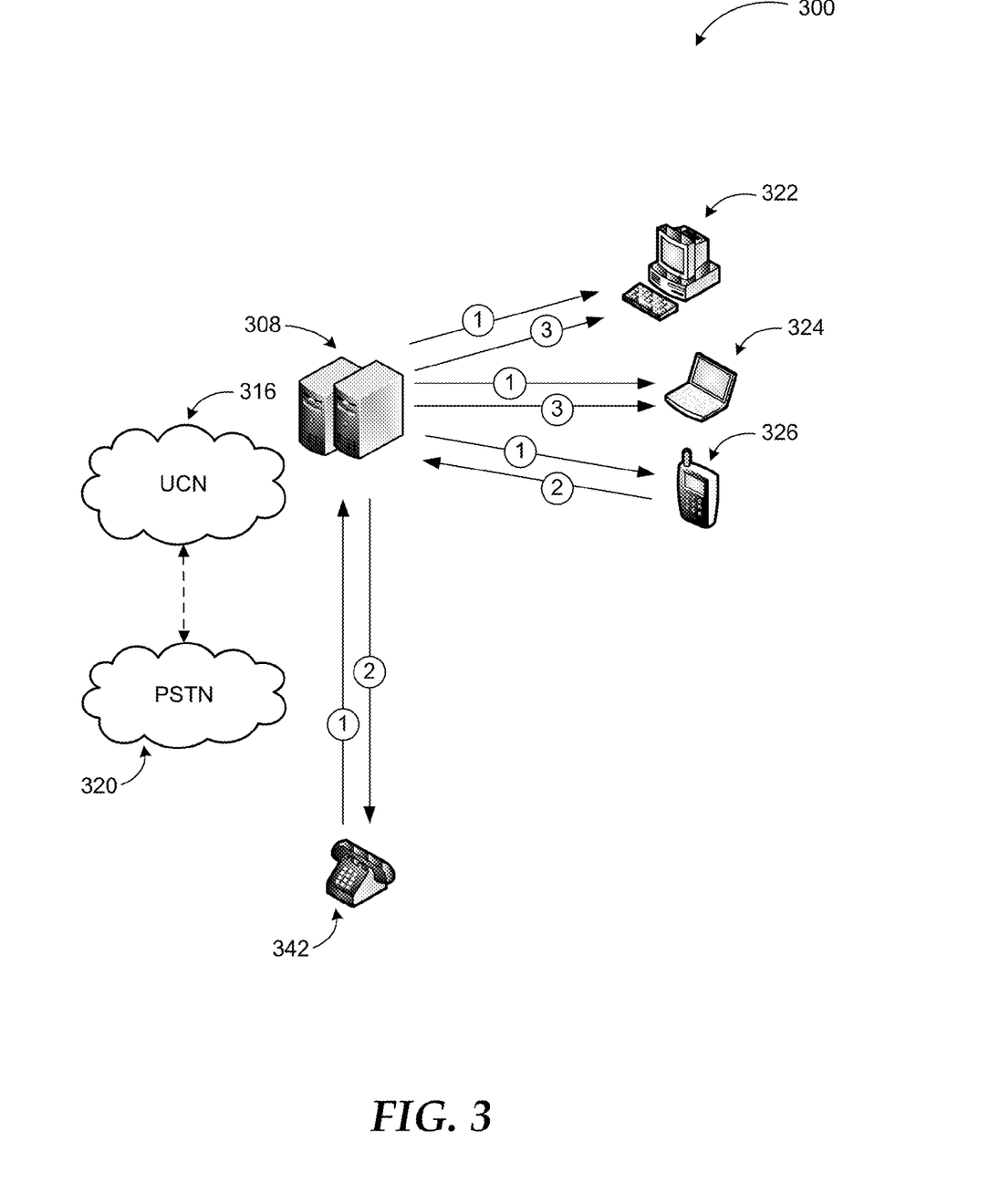
FIG. 3 is a conceptual diagram illustrating delivery of forked requests for a call originating from a PSTN and cancellation of the requests upon acceptance of the call by one of the called end devices.

FIG. 3 is a conceptual diagram illustrating delivery of forked requests for a call originating from a PSTN and cancellation of the requests upon acceptance of the call by one of the called end devices.

According to the example scenario illustrated in diagram 300, a call is originated (as shown by arrow 1) from PSTN phone 342 for a subscriber of UCN 316. The subscriber may have multiple end devices associated with him/her such as end devices 322, 324, 326. There may also be multiple communication applications executed on one or more of those end devices (video conferencing application, phone communication application, etc.). When the call reaches UC server 308, the server issues forked call requests (arrows 1 to the end devices) to all end devices and applications according to a rule defined by the subscriber. The subscriber may define rules for forwarding and simultaneous ringing of various end devices including voice mail applications etc. based on time of day, caller identification, a context of the call, and so on.

The subscriber or one of his/her designees may accept the call at one of the end devices (e.g. end device 326) sending an acknowledgment notice to the server (arrow 2), upon which the server accepts the connects the call between phone 342 and end device 326 (arrow 2) while sending cancellation notices to end devices 322 and 324 (arrows 3). In a system according to embodiments, the cancellation notices may also provide additional information such as the identity of end device 326 and whether the call was accepted or globally rejected, so that the other end devices can inform user(s) about the cancelled request and what happened to the call.

Figure 4:
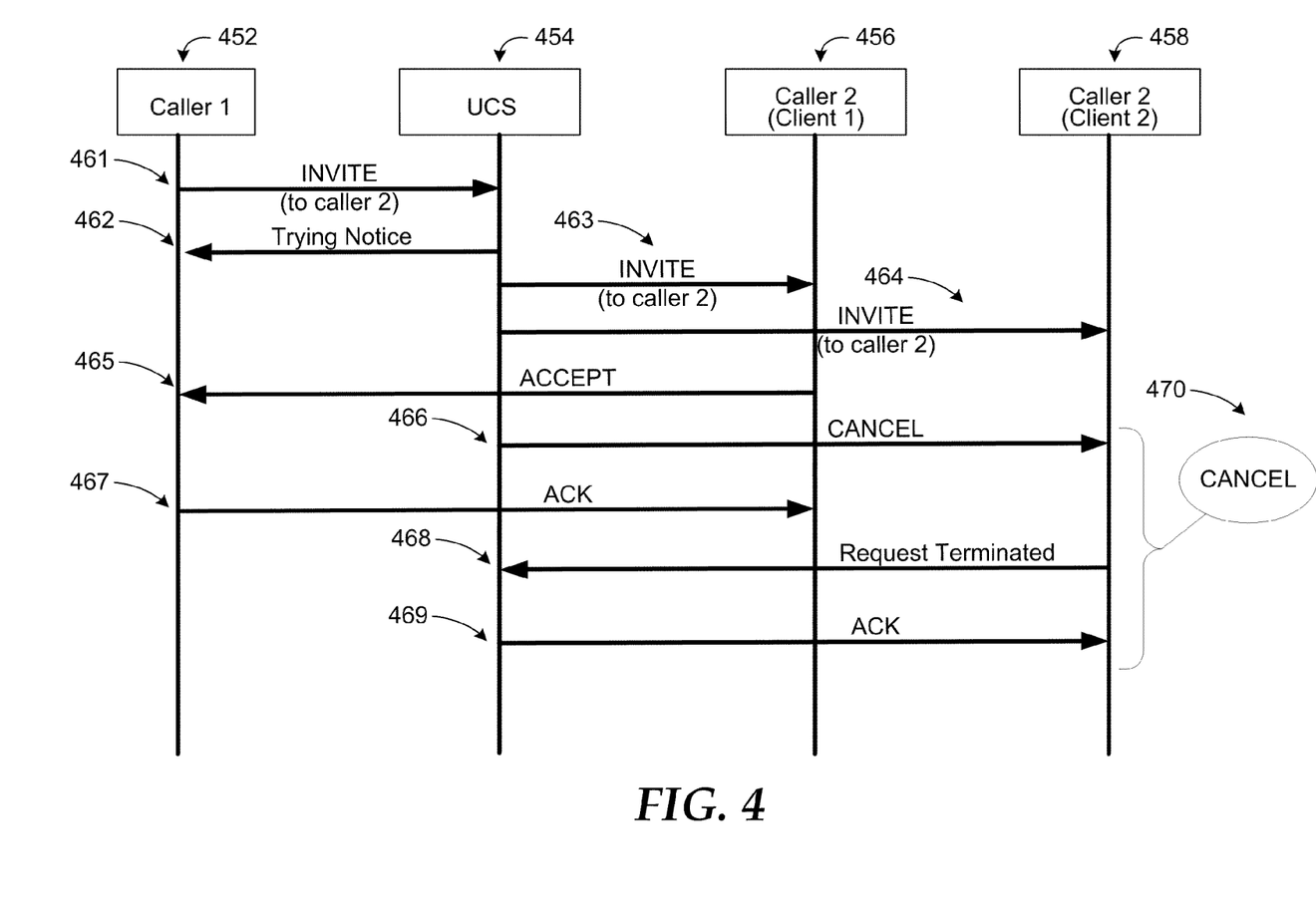
FIG. 4 is an action flow diagram illustrating actions in an integrated telephony system according to embodiments for cancellation of forked call requests with information being provided to endpoints regarding the cancellation.

FIG. 4 is an action flow diagram illustrating actions in an integrated telephony system according to embodiments for cancellation of forked call requests with information being provided to endpoints regarding the cancellation. The additional information such as the action which was performed by another endpoint, identity of a user at that station, a type of action (e.g. accepting the call, globally rejecting the call, deflecting the call to another endpoint/system, etc.), and so on may be conveyed to all other endpoints receiving the forked request. These latter stations may receive this information and perform a specific action or render it as needed to the end user.

In the example scenario illustrated by the action flow diagram, the call is originated by a subscriber of the UC system as opposed to a caller from an external network such as a PSTN or a mobile network. However, the same principles may be applied to any call originated through any network. When caller 1 (452) initiates the call through his/her end device or application to caller 2, an INVITE request is sent (461) to the UC server 454 with which the called party (caller 2) is registered. The UC server 454 then inspects the called party's preference regarding the endpoints which should ring including end devices and applications registered with caller 2, as well as endpoints registered by other users whom the caller 2 has delegated/assigned for handling his/her calls. Once the server has the list of all endpoints, it proxies/forwards the INVITE request (462, 464) to all those endpoints (e.g. 456, 458) and waits for an acceptance from one of them. In the meantime, a trying notice may be sent back to the calling party (462).

Each of these endpoints receives this request and creates a user notification (ringing sound, pop-up menu, etc.) to alert the user of an incoming call. As soon as one of the endpoints (e.g. caller 2-client 1) answers the request with a final response like acceptance (465) or a global decline. The accept notice from client 1 of caller 2 is forwarded to caller 1 by UC server 454. At the same time, a cancel notice is sent (466) to other endpoints that received the forked call request (e.g. client 2 of caller 2). The cancel notice may be followed by a request terminated confirmation (468) from the other endpoints and an acknowledgment response (469) to that. The exchanged messages 466, 468, and 469 may be collectively referred to as the cancellation process (470).

The cancel notice 466 may include additional information as listed above, which may be useful for notifying users or recording events associated with the communication system. The additional information may be provided through SIP headers in a system using SIP. For example, the identity of the user may be included in the header as SIP URI (or TEL URI), a type of action (e.g. accept or decline the call) may be inserted as a parameter into the header, and if the action was based due to implementation of an automatic policy without user interaction (e.g. Do Not Disturb or Blocked Call mode rejections) the involved policy may also be identified as a parameter in the header.

While the reason for the action (acceptance or rejection) may be specified along with the identity of the user taking the action in the cancellation notice, some users may prefer not to have their identity provided to the users on the other end devices. In such cases, the privacy of the user taking the action may be protected by blocking the identity based on local policy or user intervention. For example, if a subscriber accepts a call through his mobile phone, that information may be blocked by local policy. However, if the same subscriber accepts the call through a desktop communication device, the information may be provided to the other end devices/applications receiving forked requests associated with the call. As mentioned previously, the call may also be deflected by the subscriber to another device or system, which is another action type. The information associated with the cancel notice may also be stored in call history in addition to being provided to other endpoints.

Figure 5:
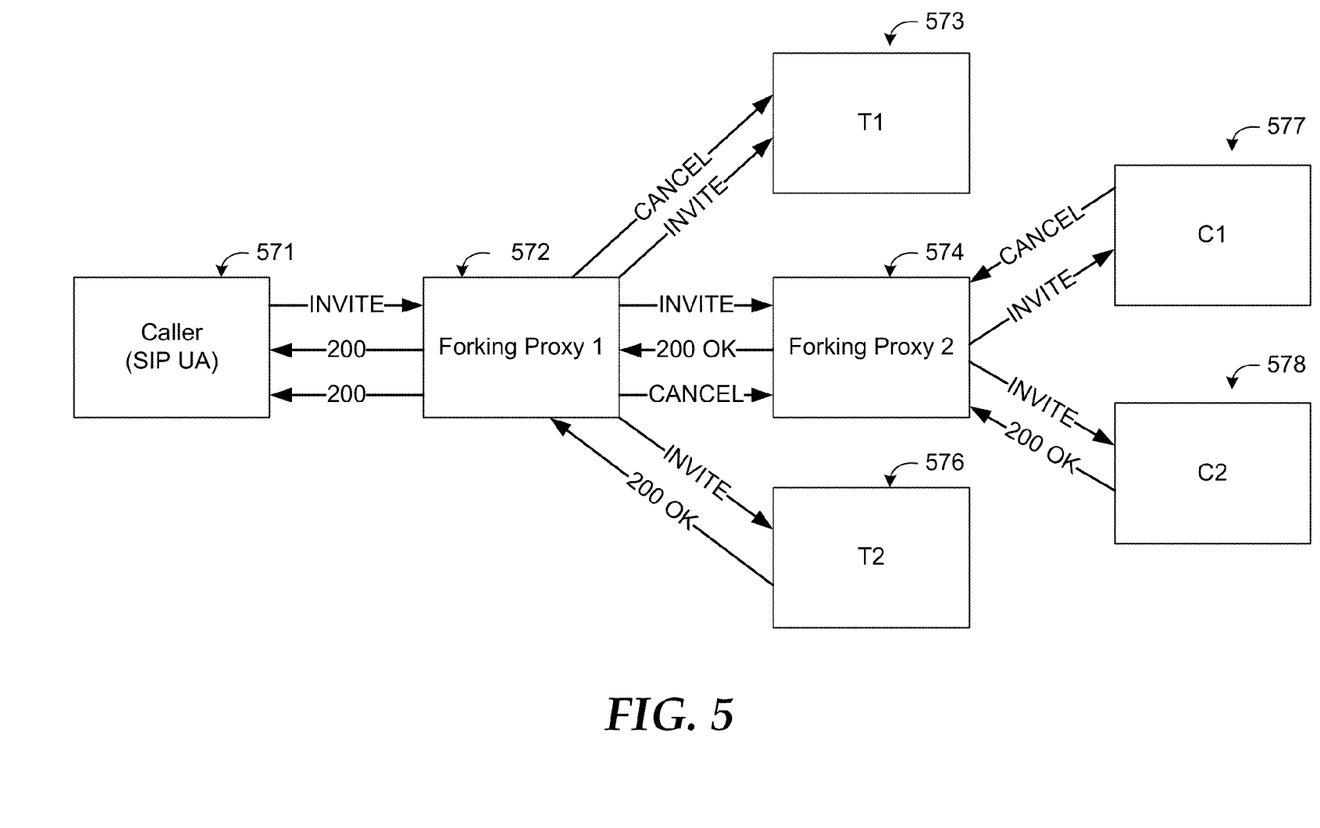
FIG. 5 illustrates an example call facilitation employing advanced proxy logic in cases where there are multiple forking proxies.

FIG. 5 illustrates an example call facilitation employing advanced proxy logic in cases where there are multiple forking proxies. According to the illustrated example scenario, a caller (571) may be the calling client SIP UA. T1 (573) and T2 (576) may be team members of SIP UA. C1 (577) and C2 (578) may be other SIP UA clients.

As shown in the diagram, an INVITE from caller 571 is forked by forking proxy 1 (572) to T1 (573), T2 (576), and forking proxy 2 574). The secondary INVITE's from forking proxy 1 (572) are secondary in timeline compared to the initial INVITE from caller 571. Forking proxy 2 (574) then forks this call further to C1 (577) and C2 (578) (tertiary INVITEs in timeline. Next, both C2 and T2 return 200 OK messages accepting the call. But before forking proxy 1 (572) has a chance to cancel the fork to forking proxy 2 (574), forking proxy 2 proxies the 200 OK back to forking proxy 1 (572). This is referred to as a race between the 200 OK and the CANCEL messages (between forking proxy 1 and forking proxy 2) as they cross each other.

In the above case, the caller's SIP UA is expected to accept one of the INVITEs for which it received 200 OK, while not accepting the other and the caller's SIP UA could make this decision in any random order or according to a predefined algorithm. This may results in a problem because the cancelled SIP UA's (T1, C1) need to know who picked up the call (in real time). To address this potential problem, forking proxies may maintain some minimal dialog state for a small period of time to check if the INVITE session (for which a 200 OK arrived) is going to be terminated immediately. After that, the forking proxy may send out CANCELs on the resulting forks. When caller's SIP UA chooses to accept one INVITE dialog and decides to send a termination message (e.g. BYE) to the others, the caller's SIP UA may include (e.g. in a special SIP header) the called party identity of the accepted session (for which the termination message was not sent). The forking proxies, after waiting for the period of time, may now be able to determine which 200 OK was accepted and which one was terminated. This information may then be used to CANCEL the remaining forks. If the CANCEL again races with another 200 OK, the caller's SIP UA may be responsible to initiate a termination message to the answered party with the message providing the special SIP header indicating that the call was already answered by some other SIP UA.

Another approach for addressing the race condition is instead of using CANCEL (and/or BYE) to indicate who answered the call, using an out-of-dialog NOTIFY (or SERVICE request or any appropriate SIP message) to indicate who answered the call. This may occur a little while after the CANCEL arrives. This could only be possible if T1, T2, C1, and C2 have early dialogs established with the caller's SIP UA. The caller's SIP UA when picking one 200 OK over the other may send an unsolicited NOTIFY to the remote target URI of each fork, also including a target-dialog header with the corresponding early dialog identifier. In addition, the message may include the special header containing the identity of the accepted session.

In above references to using a new SIP header to carry identity, one may decide to reuse the SIP Reason header with an extension parameter 'accepted-by' that carries the SIP identity of the client who accepted the call including a cause of 200 OK. The SIP identity may be gathered by the caller's SIP user agent by using the P-Asserted-Identity sent in the 200 OK response from the callee's SIP user agent.

The operations and approaches, as well as components of the integrated telephony systems, described in FIGS. 3, 4, and 5 are exemplary for illustration purposes. An integrated telephony system providing cancellation of forked call requests with additional information may be implemented using additional or fewer components and other schemes using the principles described herein.

Figure 6:
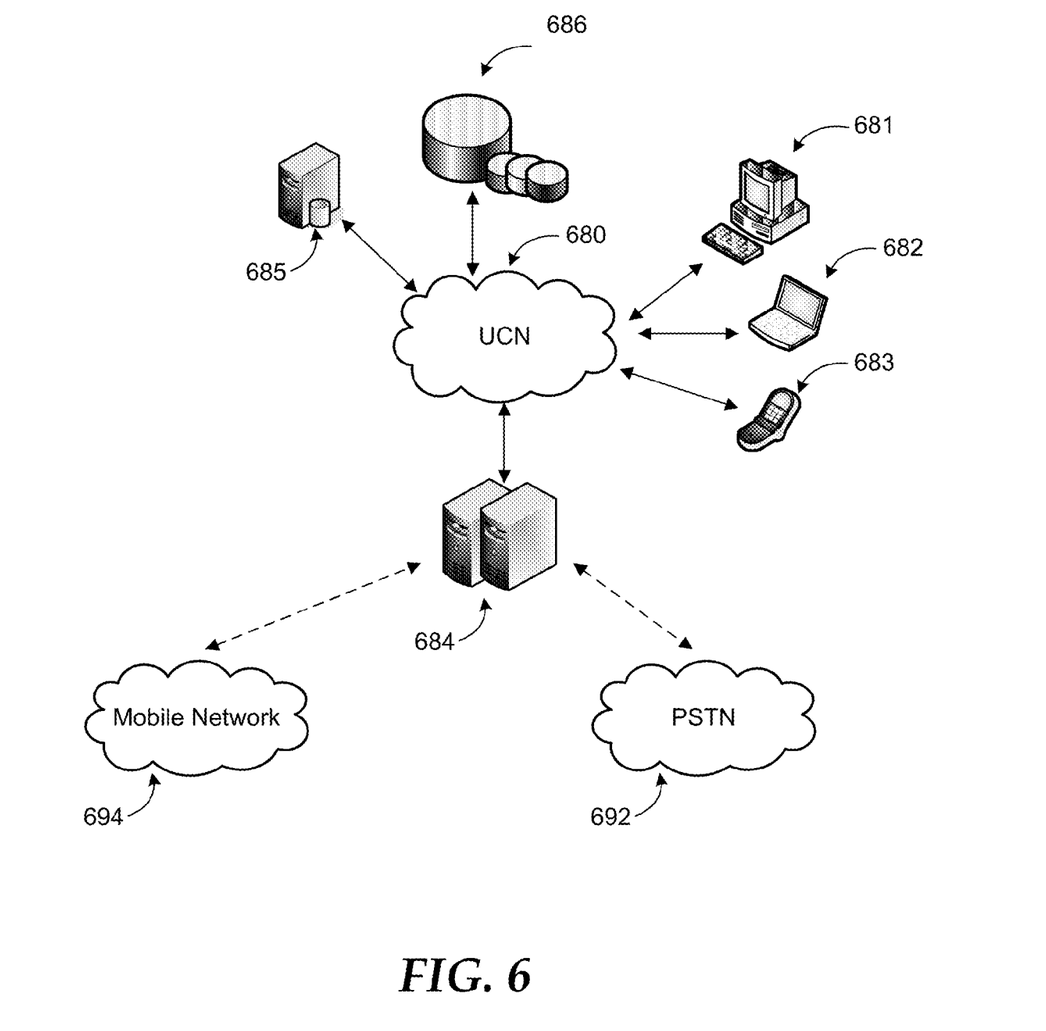
FIG. 6 illustrates a networked environment where embodiments may be implemented.

FIG. 6 is an example networked environment, where embodiments may be implemented. A unified communication system such as those described previously may be implemented locally or in a distributed manner over a number of physical and virtual clients and servers. Such a system may typically involve at least two distinct networks such as PSTN 692, Mobile Network 694, and UCN 680. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. While an integrated telephony system employing call notification merging may involve many more components, typical and relevant ones are discussed in conjunction with this figure.

A more advanced digital telephony system such as a unified communication system employing forked call cancellation with additional information may reside side-by-side with mobile networks, public switched networks, etc. and communicate through those networks with the help of PBX systems, gateways, and so on. Mediation server(s) 684 may provide signaling and media exchange between the two systems. The UC system may also include a UC server (not shown) for registering, routing, and other functionality. Data associated with the system configuration (e.g. user names, phone numbers, call policies, configuration, records, etc.) may be stored in one or more data stores such as data stores 686, which may be directly accessed by the servers and/or clients of the system or managed through a database server 685. The backbone of the UC system may be provided by a UC network (UCN) 680, which may employ a number of protocols such as SIP, RTP, and the like. Client devices (e.g. 681-683) provide platforms for UCN user end points. Users may access the communication system using a client device or one or more client applications running on a client device.

UCN 680 may include a secure network such as an enterprise network, an unsecure network such as a wireless open network, or the Internet. UCN 680 provides communication between the nodes described herein. By way of example, and not limitation, UCN 680 may include wired media such as a wired network or direct-wired connection, and wireless media such as acoustic, RF, infrared and other wireless media.

Figure 7:
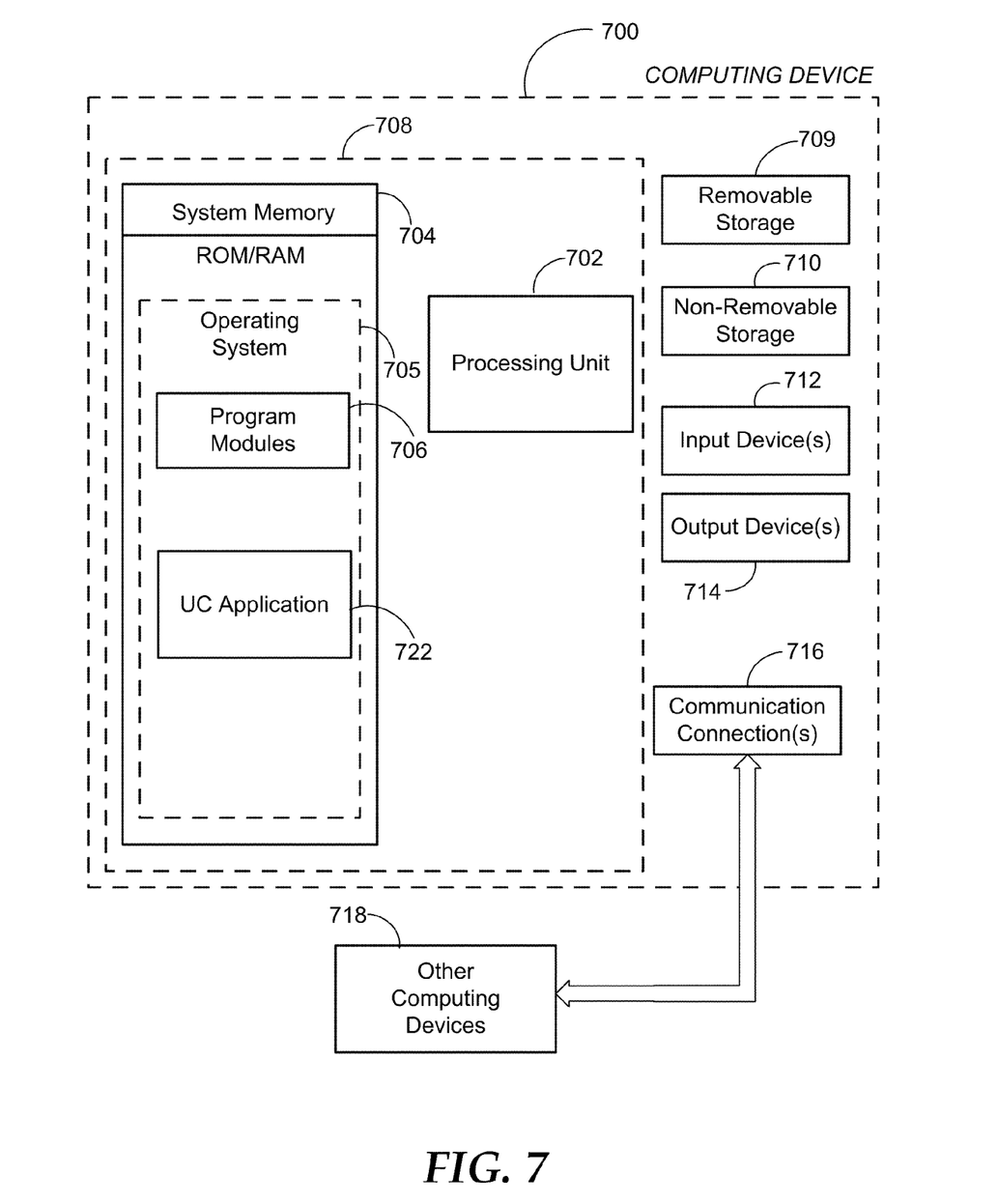
FIG. 7 is a block diagram of an example computing operating environment, where embodiments may be implemented.

Many other configurations of computing devices, applications, data sources, data distribution systems may be employed to implement a cancellation of forked call requests. Furthermore, the networked environments discussed in FIG. 7 are for illustration purposes only. Embodiments are not limited to the example applications, modules, or processes.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a server executing a UC client application for managing end devices registered with one or more users. Computing device 700 may typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706 and UC application 722.

UC application 722 may be a separate application or an integral module of a hosted service application that provides advanced communication services through computing device 700. As discussed above, UC application 722 may coordinate notification of incoming calls from various sources, provide forked call requests, facilitate the call upon acceptance by one of the endpoints, and provide cancellation notices to other endpoints with information about the call cancellation.

UC application 722 may also provide advanced functionalities of the UC system to the user such as those associated with other forms of communication (video, instant messaging, etc.). This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include client devices of a UC network as discussed above. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
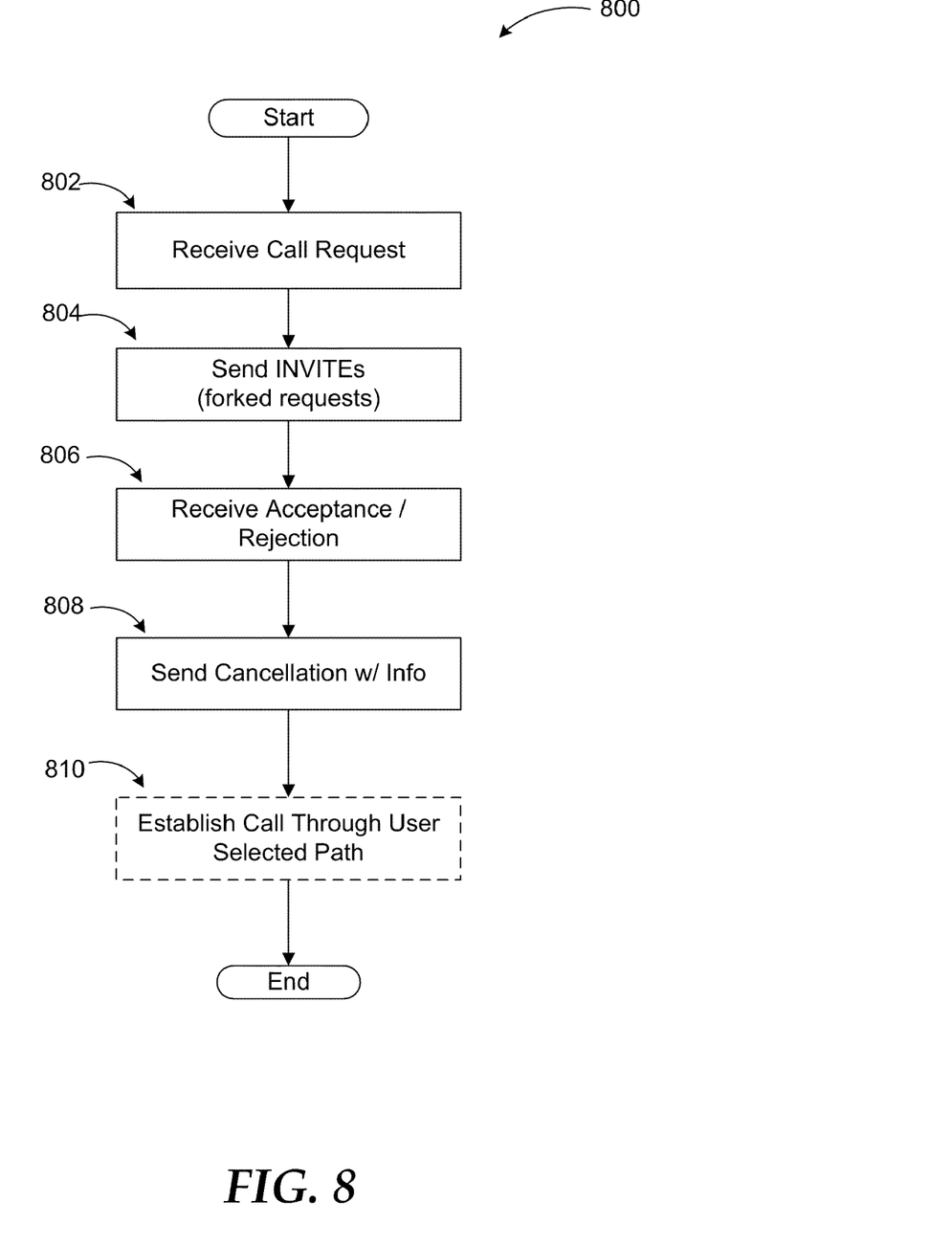
FIG. 8 illustrates a logic flow diagram for a process of cancelling forked call requests with information being provided to endpoints according to embodiments.

FIG. 8 illustrates a logic flow diagram for process 800 of cancelling forked call requests with information being provided to endpoints according to embodiments. Process 800 may be implemented in a UC application managing multiple end devices for a user in a UC system.

Process 800 begins with operation 802, where a call request for a subscriber is received from a caller from within or outside of the UC network such as a PSTN call or a mobile call. Processing advances from operation 802 to operation 804.

In response to receiving the call request, the UC server issues a plurality of INVITEs to any end devices and/or applications indicated by the subscriber's call receiving policy. A subscriber may request calls to be forwarded to multiple destinations (devices, applications) based on the time of day, day of week, context of call, identity of the originating caller, and so on. Processing moves from operation 804 to operation 806.

At operation 806, one of the INVITEs is accepted by one of the end devices or applications. Alternatively, the subscriber may respond with a global rejection indicating a desire not to have the call accepted by any of the endpoints. Processing proceeds to operation 808 from operation 806.

At operation 808, a cancellation notice is transmitted by the UC server to the remaining endpoints. Along with the cancellation notice, the UC server may provide information associated with identity of the user performing the action, type of action (e.g. acceptance, rejection), and policy information if automatic policy based action was performed without any user interaction e.g. automatic decline because user is in Do Not Disturb mode). Processing moves from operation 808 to optional operation 810, where the call is connected to the accepting end device/application, if the response was an acceptance.

The operations included in process 800 are for illustration purposes. Providing cancellation notices with information about the cancellation of a forked call request may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for cancelling forked call requests in an integrated telephony system, the method comprising:
   receiving a call request for a subscriber of the integrated telephony system;
   determining endpoints associated with the subscriber that are to be notified about the call request;
   providing the call request to the endpoints;
   maintaining a minimal dialog state for a period of time to check if a call session, associated with the call request, is going to be terminated immediately and to determine, in real time, the identity of one of the endpoints picking up a call to the subscriber;
   receiving an indication of an action from the one of the endpoints; and
   in response to the indication of the action, providing a cancellation notification to the remaining endpoints associated with the subscriber, wherein the cancellation notification includes information associated at least with the action, the information associated with the action being provided through a Session Initiated Protocol (SIP) header, the information comprising an identity of a user providing the initiation of the action, a type of the action and a policy associated with the action if the action is based on an automatic policy, the identity of the user being included in the SIP header as a SIP Uniform Resource Identifier (URI), the type of the at least one action being inserted as a parameter into the SIP header and the policy being identified as another parameter in the header.

2. The method of claim 1, wherein the action includes one of: accepting the call request, globally rejecting the call request, and deflecting the call request to one of a different system and a different endpoint.

3. The method of claim 1, wherein the identity of the user is blocked from being provided with the cancellation notification based on a local policy.

4. The method of claim 1, wherein the identity of the user is blocked from being provided with the cancellation notification based on subscriber intervention.

5. The method of claim 1, wherein the automatic policy includes one of: a do not disturb policy, a caller blocking policy, and a context based deflection policy.

6. The method of claim 1, wherein the call request is provided to the endpoints employing SIP.

7. The method of claim 1, wherein the endpoints associated with the subscriber include at least one from a set of: an end device, a communication application executed on an end device, a communication application executed on a server of the integrated telephony system, and an endpoint associated with another subscriber of the integrated telephony system.

8. The method of claim 1, wherein the call requests are sent to the endpoints as a SIP INVITE request by one of parallel transmission and serial transmission.

9. The method of claim 1, wherein the information associated with the action is stored in a call history record.

10. A computer-readable storage device with instructions stored thereon for cancelling forked call requests in a Unified Communication System (UCS), the instructions comprising:
    receiving a call request from one of: a caller within the UCS, a caller within an associated mobile network, and a caller within an associated Public Switched Telephone Network (PSTN) for a subscriber of the UCS;
    determining end devices and applications designated for notification of incoming call requests for the subscriber;
    transmitting a SIP INVITE request to the determined end devices and applications;
    maintaining a minimal dialog state for a period of time to check if a SIP INVITE session, associated with the SIP INVITE request, is going to be terminated immediately and to determine, in real time, the identity of one of the determined end devices picking up a call to the subscriber;
    receiving a response from the one of the determined end devices and applications; and
    transmitting a SIP CANCEL message to the end devices and applications other than the one transmitting the response, wherein the SIP CANCEL message includes a SIP header carrying information associated with an identity of a user providing the response, a type of the response and a policy associated with the response if the response is based on an automatic policy, the identity of the user being included in the SIP header as a SIP Uniform Resource Identifier (URI), the type of the response being inserted as a parameter into the SIP header and the policy being identified as another parameter in the header.

11. The computer-readable storage device of claim 10, wherein the instructions further comprise:
    blocking the transmission of the identity of the user if the user indicates a preference for privacy; and
    storing information carried in the SIP header in a call record.

12. A method for cancelling forked call requests in a Unified Communication System (UCS), comprising:
    receiving a call request from one of: a caller within the UCS, a caller within an associated mobile network, and a caller within an associated Public Switched Telephone Network (PSTN) for a subscriber of the UCS;
    determining end devices and applications designated for notification of incoming call requests for the subscriber;
    transmitting a SIP INVITE request to the determined end devices and applications;

maintaining a minimal dialog state for a period of time to check if a SIP INVITE session, associated with the SIP INVITE request, is going to be terminated immediately and to determine, in real time, the identity of one of the determined end devices picking up a call to the subscriber;

receiving a response from the one of the determined end devices and applications; and transmitting a SIP CANCEL message to the end devices and applications other than the one transmitting the response, wherein the SIP CANCEL message includes a SIP header carrying information associated with an identity of a user providing the response, a type of the response and a policy associated with the response if the response is based on an automatic policy, the identity of the user being included in the SIP header as a SIP Uniform Resource Identifier (URI), the type of the response being inserted as a parameter into the SIP header and the policy being identified as another parameter in the header.

13. The method of claim 12, further comprising:

blocking the transmission of the identity of the user if the user indicates a preference for privacy; and storing information carried in the SIP header in a call record.

* * * * *